(12) United States Patent
Elmers et al.

(10) Patent No.: US 7,878,887 B2
(45) Date of Patent: Feb. 1, 2011

(54) METHOD AND DEVICE FOR THE AIR-CONDITIONING OF A FREIGHT COMPARTMENT OF A CABIN OF AN AIRCRAFT

(75) Inventors: Jens Elmers, Hamburg (DE); Michael Markwart, Halstenbek (DE); Dietrich Lampe, Dresden (DE); Thomas Scherer, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 926 days.

(21) Appl. No.: 10/581,001

(22) PCT Filed: Dec. 30, 2004

(86) PCT No.: PCT/EP2004/014852
§ 371 (c)(1), (2), (4) Date: May 26, 2006

(87) PCT Pub. No.: WO2005/063573
PCT Pub. Date: Jul. 14, 2005

(65) Prior Publication Data
US 2007/0120014 A1 May 31, 2007

(30) Foreign Application Priority Data
Dec. 30, 2003 (DE) .................. 103 61 637
Sep. 21, 2004 (DE) ............ 10 2004 045 777

(51) Int. Cl.
*B64D 13/02* (2006.01)
*F28B 9/00* (2006.01)
(52) U.S. Cl. .......................... 454/71; 62/172
(58) Field of Classification Search ............. 454/71–72, 454/76; 62/172
See application file for complete search history.

(56) References Cited

U.S. PATENT DOCUMENTS

| 2,181,199 | A | * | 11/1939 | Otto | 128/201.21 |
|---|---|---|---|---|---|
| 2,232,587 | A | * | 2/1941 | Brandt | 237/5 |
| 2,281,002 | A | * | 4/1942 | Eck | 454/251 |
| 2,476,295 | A | * | 7/1949 | Hans | 165/203 |
| 2,557,099 | A | | 6/1951 | Green | |
| 3,045,983 | A | * | 7/1962 | Best | 165/235 |
| 3,203,473 | A | * | 8/1965 | Goode et al. | 165/296 |
| 4,741,255 | A | | 5/1988 | Lancaster | |

(Continued)

FOREIGN PATENT DOCUMENTS

DE 1292502 4/1969

(Continued)

OTHER PUBLICATIONS

Forms PCT/ISA/210, 220, 237 International Search Report for PCT/EP2004/014852, mailed on Apr. 7, 2005.

(Continued)

*Primary Examiner*—Steve McAllister
*Assistant Examiner*—Helena Kosanovic
(74) *Attorney, Agent, or Firm*—Wood, Herron & Evans

(57) ABSTRACT

A method and a line system for the air-conditioning of a cabin of an aircraft envisage that at sites remote from passengers air that is at a temperature lower than air at sites closer to passengers is introduced into the cabin.

16 Claims, 1 Drawing Sheet

U.S. PATENT DOCUMENTS

| | | | |
|---|---|---|---|
| 4,919,197 A * | 4/1990 | Murakami | 165/48.1 |
| 5,299,763 A | 4/1994 | Bescoby et al. | |
| 5,479,983 A | 1/1996 | Fischer | |
| 5,545,084 A | 8/1996 | Fischer | |
| 5,695,396 A * | 12/1997 | Markwart et al. | 454/76 |
| 5,890,957 A * | 4/1999 | Scherer et al. | 454/76 |
| 5,934,083 A * | 8/1999 | Scherer et al. | 62/79 |
| 6,299,525 B1 * | 10/2001 | Scheffler et al. | 454/76 |
| 6,306,032 B1 | 10/2001 | Scheffler | |
| 6,389,826 B2 * | 5/2002 | Buchholz et al. | 62/172 |
| 6,401,473 B1 * | 6/2002 | Ng et al. | 62/239 |
| 6,619,589 B2 * | 9/2003 | Brasseur et al. | 244/118.5 |

FOREIGN PATENT DOCUMENTS

| | | | |
|---|---|---|---|
| DE | 4425871 A1 | 2/1996 | |
| DE | 19642203 C1 | 1/1998 | |
| DE | 19936643 A1 | 2/2001 | |
| EP | 0683744 B1 | 5/1997 | |
| GB | 954342 | 4/1964 | |
| JP | 54151297 A | 11/1979 | |
| JP | 04015198 | 1/1992 | |
| JP | 08080726 A * | 3/1996 | |
| RU | 2231482 C1 | 6/2004 | |

OTHER PUBLICATIONS

English Translation of Decision On Granting A Patent for Invention, Russian Patent Office, Oct. 9, 2008.

* cited by examiner

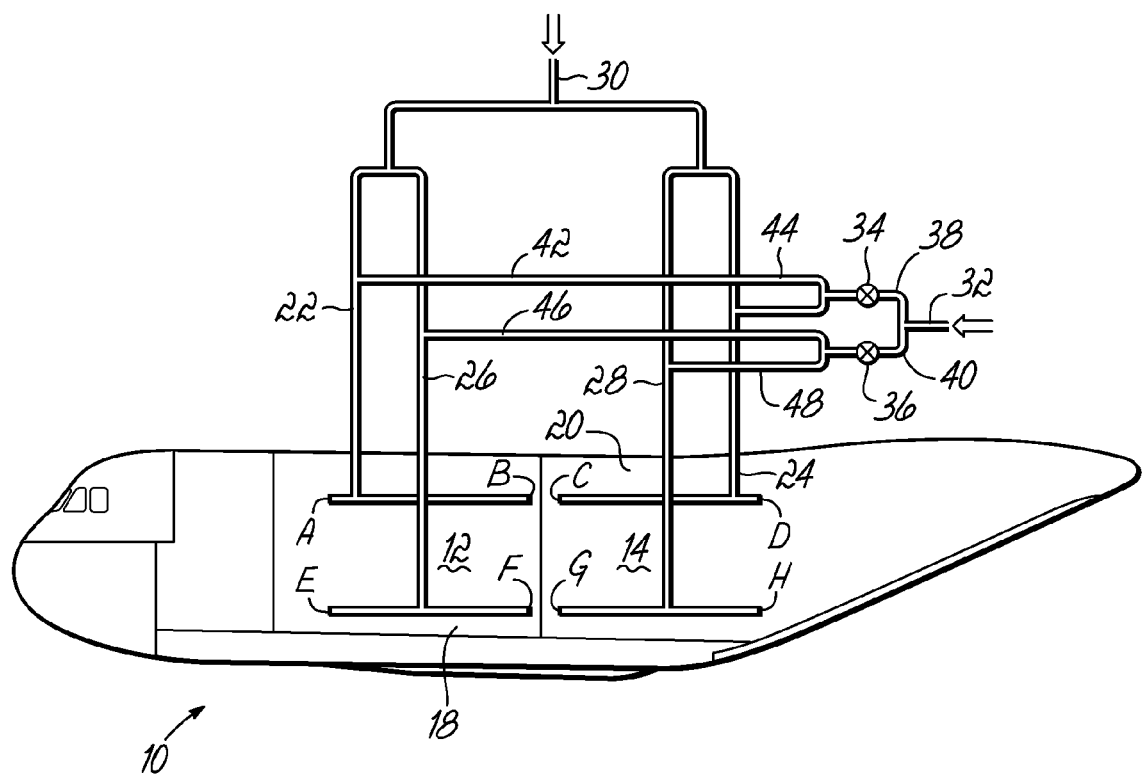

METHOD AND DEVICE FOR THE AIR-CONDITIONING OF A FREIGHT COMPARTMENT OF A CABIN OF AN AIRCRAFT

Background

The present invention relates to a method and a device for the air-conditioning of a freight compartment or a cabin of an aircraft.

According to the latest prior art, aircraft cabins are for example air-conditioned in such a way that temperature-controlled mixed air is blown into the cabin in the upper region of the cabin, i.e. in the roof region. The term "air-conditioning" covers in this case not only in the narrow sense the adjustment of the temperature and atmospheric humidity conditions but also the adjustment, in particular regulation, of the important parameters of the injected air, in particular therefore its temperature. This applies also to the invention described herein.

In modern aircraft the so-called mixed air blown into the cabin is normally composed of three components, namely so-called recirculated air, temperature-controlled fresh air, and so-called propulsion fuel air. Recirculation air is air from the cabin or from the freight compartment that is reused. The treatment of recirculation air and fresh air is known as such from for example DE 199 36 643 A1. In the prior art the temperature of the fresh air is normally adjusted to the lowest level of all connected fresh air users (i.e. the units in the aircraft that use fresh air). In order to achieve a desired temperature in the cabin, the inflowing mixed air is admixed, depending on the temperature requirements, with a regulated amount of propulsion fuel air. In the prior art the temperature-regulated mixed air is fed via a plurality of lines that lead to different sites in the cabin, wherein the mixed air blown in at the different sites into the cabin (or freight compartment) is in each case at a temperature that is adjusted or regulated to the same value. Such methods and devices for the air-conditioning of aircraft cabins are for example also known from DE 196 42 203 C1 and U.S. Pat. No. 4,741,255.

The known methods and devices for the air-conditioning of aircraft cabins or freight compartments experience difficulties in ensuring a good thermal comfort for the passengers, particularly if the cabin walls have widely varying thermal properties, i.e. in particular fairly large differences in thermal conductivity. Such relatively large differences in thermal conductivity occur in particular between the cabin floor and the cabin side walls.

SUMMARY OF THE INVENTION

The object of the invention is to provide a method and a device for the air-conditioning of a freight compartment or the cabin of an aircraft, by means of which a high thermal comfort for the passengers as well as a good air quality can be achieved. In order to obtain a sufficient air quality a specific minimum air throughput is necessary. The air quality is measured in particular by the carbon dioxide and carbon monoxide levels, atmospheric humidity, as well as the concentration of harmful substances.

To achieve this object the method according to the invention for the air-conditioning of a freight compartment or a cabin of an aircraft envisages that simultaneously at sites remote from passengers air that is at a temperature different from that at sites closer to passengers is introduced into the freight compartment and/or the cabin.

The sites closer to passengers in the above sense are located in the floor region and the sites remote from passengers are located in the roof region of the cabin. The temperature difference between the air blown in close to passengers and remote from passengers depends on the instantaneous temperature conditions, and in particular on whether the passenger compartment has to be heated or cooled. A cooling of the passenger compartment has great practical significance. If a cooling of the cabin is necessary, then overall cold air has to be blown in, though of course the passengers should not be directly subjected to very cold air. Accordingly, according to a preferred modification of the invention, in the case of a necessary cooling somewhat warmer air is blown in at positions close to passengers than at sites remote from passengers.

In the case of a necessary heating of the cabin a similar procedure is preferably adopted: in order not to subject the passengers directly to a relatively hot stream of air, under these conditions somewhat hotter air is preferably blown into the cabin at sites remote from passengers than at sites closer to passengers.

The line system according to the invention for the air-conditioning of a freight compartment or a cabin of an aircraft envisages at least first and second line branchings via which air at different temperatures can be fed on the one hand to sites remote from passengers and on the other hand to sites of the freight compartment and/or cabin closer to passengers.

According to a further preferred modification of the invention the mixed air, which may be composed as desired of three components and which is introduced into the cabin and/or the freight compartment, is fed through basically two feed lines into a line system. One of the feed lines conveys, as required, temperature-controlled fresh air and recirculated air. The other feed line conveys, as required, a larger or smaller amount of hot propulsion fuel air.

The different air temperatures in the aforementioned first and second line branchings are achieved in a simple way with control means, for example a valve, which adjusts the ratio of the propulsion fuel air to fresh air and recirculated air in the first and second line branchings.

The invention provides in particular for the wellbeing of passengers if the freight compartment of a transport aircraft is also used in order to carry a larger number of persons. The wellbeing of the passengers is also achieved in this case if the floor is, on account of the poor thermal insulation capacity, relatively cold compared to the side walls. Compared to the prior art the wellbeing of the passengers is also achieved by the invention on account of the fact that their comfort is not adversely affected by air that is too hot in the floor region. By means of the invention a uniform temperature and flow speed distribution of the air in the freight compartment and/or cabin is achieved and the uniform temperatures of the walls surrounding the passengers raise the so-called thermal comfort. At the same time the invention provides for a good air quality by means of an air throughput necessary for this purpose. One embodiment of the invention is described in more detail hereinafter with the aid of the drawing.

BRIEF DESCRIPTION OF THE DRAWINGS

The FIGURE is a schematic view of one embodiment of the air-conditioning line system of the invention.

DETAILED DESCRIPTION

The FIGURE shows diagrammatically an aircraft and a line system for the air-conditioning of a freight compartment or a cabin in the aircraft. The diagrammatically illustrated aircraft 10 has freight compartments 12, 14. A larger number of passengers can also be conveyed in the freight compartments 12, 14. As a variant of the illustrated example of implementation, instead of the freight compartments cabins too can be air-conditioned in a similar way with the line system described in more detail hereinafter. The freight compartments 12, 14 have in each case a floor region 18 and a roof region 20.

The line system illustrated in the FIGURE for feeding mixed air into the freight compartments 12, 14 also serving to carry passengers has a first line branching 22, 24 that leads into the roof region 20.

A second line branching 26, 28 leads into the floor region 18. A feed line 30 comes from a mixing chamber (not shown), in which temperature-controlled fresh air and recirculated air are mixed. The arrow shows the flow direction in the feed line 30.

Another feed line 32 conveys hot engine bleed air.

The temperature-controlled air adjusted by sensors and a regulating device known per se is blown from the first line branching 22, 24 through pipes A, B, C, D extending in the longitudinal direction of the cabin, into the freight compartment or the cabin. For this purpose the pipes A, B, C, D have openings regularly distributed over their length for the outflow of air.

The temperature-controlled air conveyed through the second line branching 26, 28 is blown through pipes E, F, G, H into the freight compartment and/or the cabin, wherein the pipes E, F, G, H in the floor region 18 likewise extend in the longitudinal direction of the cabin and have openings.

If the cabin has to be cooled on account of the ambient conditions, then air is blown in through the pipes A, B, C, D laid remote from the passengers that is somewhat cooler than the air blown in through the pipes E, F, G, H in order to prevent the passengers being subjected to an unpleasantly cold stream of air, with possibly the accompanying danger of catching cold.

The individual temperatures to be adjusted of the air leaving the openings in the pipes A, B, C, D, E, F, G, H are set as desired by the control system, depending on the ambient conditions. The temperature adjustment is performed as follows:

The hot engine bleed air introduced through the feed line 32 into the line system is split into two line branches 38, 40, in which are arranged valves 34, 36 that can be controlled as regards the air throughput. The hot engine bleed air controlled by means of the valve 34 passes through lines 42 and 44 into the two lines 22, 24 of the first line branching. In other words, the supply of hot engine bleed air to the first line branching 22, 24 is adjusted via the valve 34

The hot engine bleed air flowing through the adjustable valve 36 passes through lines 46, 48 into the two lines 26, 28 of the second line branching. The temperature of the air blown through the second line branching 26, 28 into the floor region 18 is thus adjusted by the setting of the valve 36.

If one of the valves 34 or 36 is opened further, the throughput of hot engine bleed air in the relevant first or second line branching is raised and the temperature of the mixed air blown out through this line branching is thus also increased. Sensors for the temperature measurement in the freight compartments or cabins are known as such and may be used according to the prior art. Likewise, the equipment for obtaining fresh air and its temperature regulation as well as the equipment for recirculating the cabin air before the latter is fed through the aforedescribed feed line 30 to the line system according to the invention, are also known. The same applies as appropriate to the necessary temperature sensors and computer-controlled regulation device by means of which the necessary temperatures of the air that is blown in are regulated. The regulation is governed by various parameters, such as for example the desired internal temperature in the freight compartment or the cabin, the external temperature, and the cabin occupancy. Depending on this, the air blown out in the floor region 18 through the openings in the pipes E, F, G, H will have a temperature that is a few degrees centigrade lower than the air in the roof region 20 blown in from the openings in the pipes A, B, C, D. However, if the temperature in the freight compartment or in the cabin is to be raised compared to an actual value, then the air blown out in the floor region 18 as a rule has a higher temperature than this actual value.

If on the other hand the temperature in the freight compartment or cabin is to be reduced compared to an actual value, then the air blown out in the floor region 18 through the openings in the pipes E, F, G, H will have a temperature that is a few degrees centigrade higher than the temperature of the air in the roof region 20 blown in from the openings in the pipes A, B, C, D. The air blown out in the floor region 18 and in the roof region 20 then has a lower temperature than the actual value.

The invention claimed is:

1. Method for cooling a passenger cabin of an aircraft, comprising:
   introducing a first stream of cooling air at a first temperature into a conditioned air space in the passenger cabin at first sites remote from passengers; and
   introducing a second stream of cooling air at a second temperature into the conditioned air space in the passenger cabin at second sites closer to passengers than the first sites,
      wherein when cooling is required in the passenger cabin the first temperature is lower than the second temperature, and both the first and second temperatures of the first and second streams of cooling air are lower than an ambient temperature of the passenger cabin.

2. Method according to claim 1, wherein the second sites are located nearer to a floor of the passenger cabin than the first sites.

3. Method according to claim 2, wherein the second sites are located on the floor of the passenger cabin and the first sites are located in an upper region of the passenger cabin.

4. Method according to claim 1, wherein the first and second streams of cooling air introduced into the passenger cabin at the first and second sites are fresh air, in particular temperature-controlled fresh air, and comprise engine bleed air.

5. Method according to claim 4, wherein the first and second streams of cooling air introduced into the passenger cabin at the first and second sites also comprise recirculated air.

6. System for air-conditioning a passenger cabin of an aircraft, comprising:
   at least a first line branching that leads to a first region of the passenger cabin remote from passengers, the first line branching delivering a first air mixture at a first temperature to the passenger cabin;
   at least a second line branching that leads to a second region of the passenger cabin, said second region being closer to passengers than said first region, the second line branching delivering a second air mixture at a second temperature to the passenger cabin;
   a first valve coupled with the first line branching and operable to control the first temperature by modifying an amount of hot bleed air added to the first air mixture; and a second valve coupled with the second line branching and operable to control the second temperature by modifying an amount of hot bleed air added to the second air mixture, wherein, when cooling is required, the first and second valves are configured to control the first temperature to be lower than the second temperature and both the first and second temperatures to be lower than an ambient temperature of the passenger cabin, and wherein, when heating is required, the first and second valves are configured to control the first temperature to be higher than the second temperature, and both the first and second temperatures to be higher than the ambient temperature of the passenger cabin.

7. System according to claim 6, wherein the first region of the passenger cabin is an upper region of the passenger cabin and the second region of the passenger cabin is a floor region of the passenger cabin.

8. System according to claim 6, wherein the first line branching is connected to at least one feed line for temperature-controlled fresh air and recirculated air, and to at least one feed line for hot engine bleed air.

9. System according to claim 8, wherein the second line branching is connected to at least one feed line for temperature-controlled fresh air and recirculated air, and to at least one feed line for hot engine bleed air.

10. Method according to claim 1, wherein the first and second streams of cooling air introduced into the passenger cabin at the first and second sites contains an adjustable amount of engine bleed air, the adjustable amount of engine bleed air determined by temperature measurements of the passenger cabin.

11. System according to claim 6, wherein the first line branching and the second line branching are coupled to at least one feed line for hot engine bleed air at the respective first and second valves, said first and second valves adjusting the amount of hot engine bleed air delivered to the first and second line branching according to temperature measurements of the passenger cabin.

12. Method for heating a passenger cabin of an aircraft, comprising:

introducing a first stream of heating air at a first temperature into a conditioned air space in the passenger cabin at first sites remote from passengers; and introducing a second stream of heating air at a second temperature into the conditioned air space of the passenger cabin at second sites closer to passengers than the first sites, wherein the first temperature is higher than the second temperature, and both the first and second temperatures of the first and second streams of heating air are higher than an ambient temperature of the passenger cabin.

13. Method according to claim 12, wherein the second sites are located nearer to a floor of the passenger cabin than the first sites.

14. Method according to claim 13, wherein the second sites are located on the floor of the passenger cabin and the first sites are located in an upper region of the passenger cabin.

15. Method according to claim 12, wherein the first and second streams of heating air introduced into the passenger cabin at the first and second sites are fresh air, in particular temperature-controlled fresh air, and comprise engine bleed air.

16. Method according to claim 15, wherein the first and second streams of heating air introduced into the passenger cabin at the first and second sites also comprise recirculated air.

* * * * *